(12) United States Patent
Koui et al.

(10) Patent No.: US 9,355,659 B2
(45) Date of Patent: May 31, 2016

(54) MICROWAVE ASSISTED MAGNETIC RECORDING HEAD AND MAGNETIC RECORDING DEVICE HAVING THE SAME

(71) Applicant: KABUSHIKI KAISHA TOSHIBA, Tokyo (JP)

(72) Inventors: Katsuhiko Koui, Yokohama Kanagawa (JP); Mariko Shimizu, Kawasaki Kanagawa (JP); Shuichi Murakami, Shinagawa Tokyo (JP); Kenichiro Yamada, Minato Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/743,526

(22) Filed: Jun. 18, 2015

(65) Prior Publication Data
US 2015/0380022 A1    Dec. 31, 2015

(30) Foreign Application Priority Data
Jun. 30, 2014   (JP) .................... 2014-134612

(51) Int. Cl.
| G11B 5/127 | (2006.01) |
| G11B 5/35 | (2006.01) |
| G11B 5/39 | (2006.01) |
| G11B 5/23 | (2006.01) |
| G11B 5/31 | (2006.01) |
| G11B 5/00 | (2006.01) |

(52) U.S. Cl.
CPC ............. *G11B 5/35* (2013.01); *G11B 5/1278* (2013.01); *G11B 5/23* (2013.01); *G11B 5/3133* (2013.01); *G11B 5/3912* (2013.01); *G11B 2005/0024* (2013.01)

(58) Field of Classification Search
CPC .. G11B 5/3133; G11B 5/3143; G11B 5/1278; G11B 5/23
USPC ........................................ 360/125.3
See application file for complete search history.

(56) References Cited

U.S. PATENT DOCUMENTS

| 8,462,461 | B2* | 6/2013 | Braganca | G01R 33/093 360/125.3 |
| 9,047,888 | B2* | 6/2015 | Katada | G11B 5/314 |
| 9,064,508 | B1* | 6/2015 | Shiimoto | G11B 5/187 |
| 2008/0019040 | A1* | 1/2008 | Zhu | B82Y 10/00 360/110 |
| 2010/0027158 | A1* | 2/2010 | Takagishi | G11B 5/02 360/77.02 |
| 2011/0216436 | A1* | 9/2011 | Igarashi | G11B 5/314 360/61 |
| 2012/0126905 | A1* | 5/2012 | Zhang | G11B 5/3146 331/94.1 |
| 2012/0262820 | A1 | 10/2012 | Matsumoto et al. | |
| 2013/0057983 | A1* | 3/2013 | Tanabe | G11B 5/012 360/234.3 |
| 2013/0271866 | A1* | 10/2013 | Sato | G11B 5/147 360/71 |
| 2015/0098150 | A1* | 4/2015 | Chiu | G11B 5/3163 360/125.03 |
| 2015/0103431 | A1* | 4/2015 | Igarashi | G11B 5/3116 360/59 |

FOREIGN PATENT DOCUMENTS

JP    2011198399 A    10/2011

* cited by examiner

*Primary Examiner* — Jefferson Evans
(74) *Attorney, Agent, or Firm* — Patterson & Sheridan, LLP (57) ABSTRACT

A magnetic recording head includes a main magnetic pole in which a recording magnetic field is generated, a write shield magnetic pole disposed alongside the main magnetic pole with a gap therebetween, a spin torque oscillator disposed within the gap and configured to generate a microwave, an anti-ferromagnetic layer disposed within the gap between the write shield magnetic pole and the spin torque oscillator, and a non-magnetic metal layer disposed within the gap between the spin torque oscillator and the anti-ferromagnetic layer.

29 Claims, 8 Drawing Sheets

MICROWAVE ASSISTED MAGNETIC RECORDING HEAD AND MAGNETIC RECORDING DEVICE HAVING THE SAME

CROSS-REFERENCE TO RELATED APPLICATION

This application is based upon and claims the benefit of priority from Japanese Patent Application No. 2014-134612, filed Jun. 30, 2014, the entire contents of which are incorporated herein by reference.

FIELD

Embodiments described herein relate generally to a microwave assisted magnetic recording head and a magnetic recording device having the microwave assisted magnetic recording head.

BACKGROUND

Generally, a magnetic disk device has a magnetic disk that is provided inside a case, a spindle motor that supports and rotates the magnetic disk, a magnetic head that reads data from or writes data on the magnetic disk, and a carriage assembly that supports the magnetic head such that the magnetic head is freely movable with respect to the magnetic disk. The head part of the magnetic head includes a recording head for the writing and a reproducing head for the reading.

One type of a recording head writes data on the magnetic disk perpendicularly to obtain high recording density, high capacity, or a small size. This type of the recording head typically includes a main magnetic pole that generates a perpendicular magnetic field, a write shield magnetic pole that is disposed so as to face the main magnetic pole with a gap, and a coil for causing a magnetic flux to flow in the main magnetic pole.

To further improve the recording density, a recording head of the perpendicular recording type may carries out a microwave-assisted magnetic recording. In such a recording head, a spin torque oscillator which is used as a microwave generator is disposed between a main magnetic pole and a write shield magnetic pole, and a microwave is applied from the spin torque oscillator to the magnetic disk.

DETAILED DESCRIPTION

In a recording head of a microwave-assisted recording type, the spin torque oscillator is typically formed in the vicinity of a recording magnetic pole. Due to a magnetic field interaction between the recording magnetic pole and the oscillating layer of the spin torque oscillator, a spin wave may be induced in the recording magnetic pole, and oscillation of the spin torque oscillator may be suppressed. Therefore, it becomes difficult to perform the microwave-assisted magnetic recording in a reliable manner.

Embodiments provide a microwave-assisted magnetic recording head having a microwave oscillation efficiency and capable of performing a stable microwave-assisted magnetic recording, and a magnetic recording device having such a microwave-assisted magnetic recording head.

In general, according to one embodiment, a magnetic recording head includes a main magnetic pole in which a recording magnetic field is generated, a write shield magnetic pole disposed alongside the main magnetic pole with a gap therebetween, a spin torque oscillator disposed within the gap and configured to generate a microwave, an anti-ferromagnetic layer disposed within the gap between the write shield magnetic pole and the spin torque oscillator, and a non-magnetic metal layer disposed within the gap between the spin torque oscillator and the anti-ferromagnetic layer.

Hereinafter, various embodiments will be described with reference to the accompanying drawings.

First Embodiment

Figure 1:
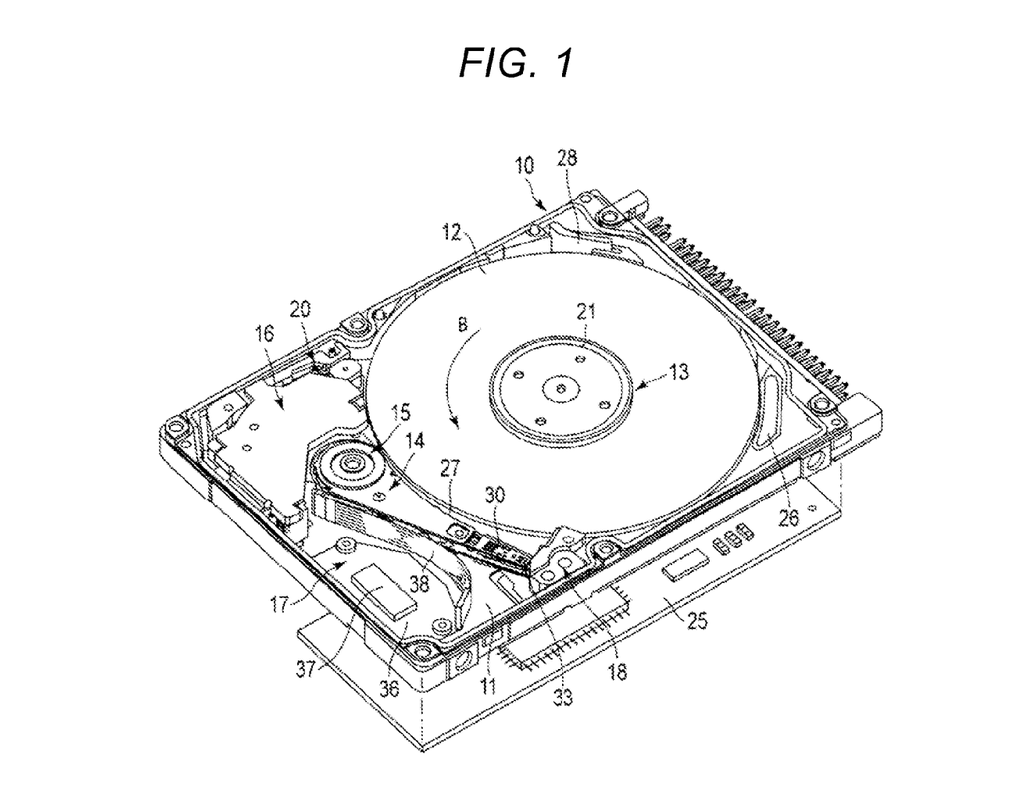
FIG. 1 is a perspective view of a magnetic disk device (HDD) according to a first embodiment.

FIG. 1 illustrates an internal structure of a hard disk drive (HDD) according to a first embodiment and acting as a magnetic recording device. As illustrated in FIG. 1, the HDD includes a housing 10. The housing 10 includes a base 11 having a rectangular box shape without a top, and a top cover (not illustrated) having a rectangular plate shape. The top cover is screwed to the base by a plurality of screws, so as to cover the upper opening of the base. Therefore, the inside of the housing 10 is kept airtight, and is connected to the outside only through a breathing filter 26 such that ventilation is possible.

On the base 11, a magnetic disk 12 serving as a recording medium and a driving unit are provided. The driving unit includes a spindle motor 13 for supporting and rotating the magnetic disk 12, a plurality of, for example, two magnetic heads 33 for recording or reproducing information with respect to the magnetic disk 12, a head actuator 14 for supporting the magnetic heads 33 such that the magnetic heads 33 are freely movable with respect to the surface of the magnetic disk 12, and a voice coil motor (hereinafter, VCM) 16 for rotating and positioning the head actuator 14. Also, provided on the base 11 are a ramp load mechanism 18 which holds the magnetic heads 33 at positions apart from the magnetic disk 12 if the magnetic heads 33 reaches the outermost periphery of the magnetic disk 12, an inertia latch 20 which holds the head actuator 14 at a retraction position if an impact or the like is applied to the HDD, and a base plate unit 17 which has electric components such as a conversion connector 37 mounted thereon.

The magnetic disk 12 is concentrically fit onto a hub of the spindle motor 13 while being clamped by a clamp spring 21 screwed to the upper end of the hub, thereby being fixed to the hub. The magnetic disk 12 is rotated at a predetermined speed in a direction illustrated by an arrow "B", by the spindle motor 13 acting as a drive motor.

On the outer surface of the base 11, a control circuit board 25 is screwed so as to face the bottom wall of the base 11. The control circuit board 25 controls the operations of the spindle motor 13, the VCM 16, and the magnetic heads 33 through the base plate unit 17.

Figure 2:
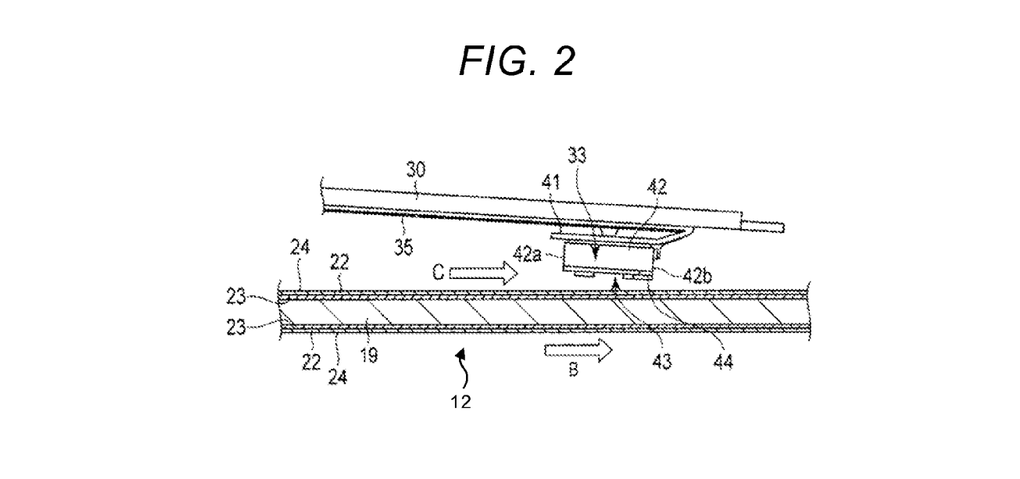
FIG. 2 is a side view of a magnetic head, a suspension, and a magnetic disk included in the HDD.

FIG. 2 illustrates the magnetic disk 12, and the magnetic head 33 in a floating state. As illustrated in FIGS. 1 and 2, the magnetic disk 12 is configured as a perpendicular magnetic recording film medium. The magnetic disk 12 has a base 19 which is formed of a non-magnetic material, for example, in a disk shape having a diameter of about 2.5 inches. On each surface of the base 19, a soft magnetic layer 23 is formed as a base layer. Further, on the soft magnetic layer 23, a perpendicular magnetic recording layer 22 is formed so as to have magnetic anisotropy in a direction perpendicular to the disk surface. Further, on the perpendicular magnetic recording layer 22, a protective layer 24 is formed.

The head actuator 14 includes a bearing member 15 which is fixed on the bottom wall of the base 11, a plurality of arms 27 which extends from the bearing member, and suspensions 30 which have elongated plate shapes and are elastically deformable. The base end of each suspension 30 is fixed to the tip of a corresponding arm 27 by spot welding or bonding, such that each suspension 30 extends from the corresponding arm 27. On the extended end of each suspension 30, a magnetic head 33 is supported via a gimbal spring 41. Each magnetic head 33 is electrically connected to a main FPC 38 of the base plate unit 17 through a wiring member (a relay FPC) 35 fixed on a corresponding arm 27 and a corresponding suspension 30.

As illustrated in FIG. 2, each magnetic head 33 is configured as a floating-type head, and includes a slider 42 which is formed substantially in a rectangular parallelepiped shape, and a head part 44 that is provided at the outflow (trailing) side end portion of the slider. The slider 42 is formed of, for example, a sintered body of alumina and titanium carbide (AlTiC). The head part 44 is formed of a plurality of stacked thin films.

The slider 42 has a disk facing surface (air bearing surface (ABS)) 43 which is rectangular and faces the surface of the magnetic disk 12. The slider 42 is maintained in a state in which the slider is apart from the surface of the magnetic disk by a predetermined distance due to an air flow C generated between the surface of the magnetic disc 12 and the disk facing surface 43 by rotation of the magnetic disk 12. The direction of the air flow C is the same as the rotation direction B of the magnetic disk 12. The slider 42 is disposed with respect to the surface of the magnetic disk 12 such that the longitudinal direction of the disk facing surface 43 is subsequently the same as the direction of the air flow C. The slider 42 has a leading end 42a, which is positioned on the inflow side of the air flow C, and a trailing end 42b, which is positioned on the outflow side of the air flow C.

If electric power is applied to the voice coil of the VCM 16 in a state where the magnetic disk 12 is rotating, the head actuator 14 rotates, and the magnetic heads 33 are moved such that one of them is positioned on a desired track of the magnetic disk 12. At this time, the magnetic heads 33 are moved along the radial direction of the magnetic disk 12 between the inner end portion and outer end portion of the magnetic disk. Also, due to the air flow C generated by the rotation of the magnetic disk 12, the magnetic heads 33 are apart from the surface of the magnetic disk 12 so as to face the disk surface with a minute gap.

Figure 3:
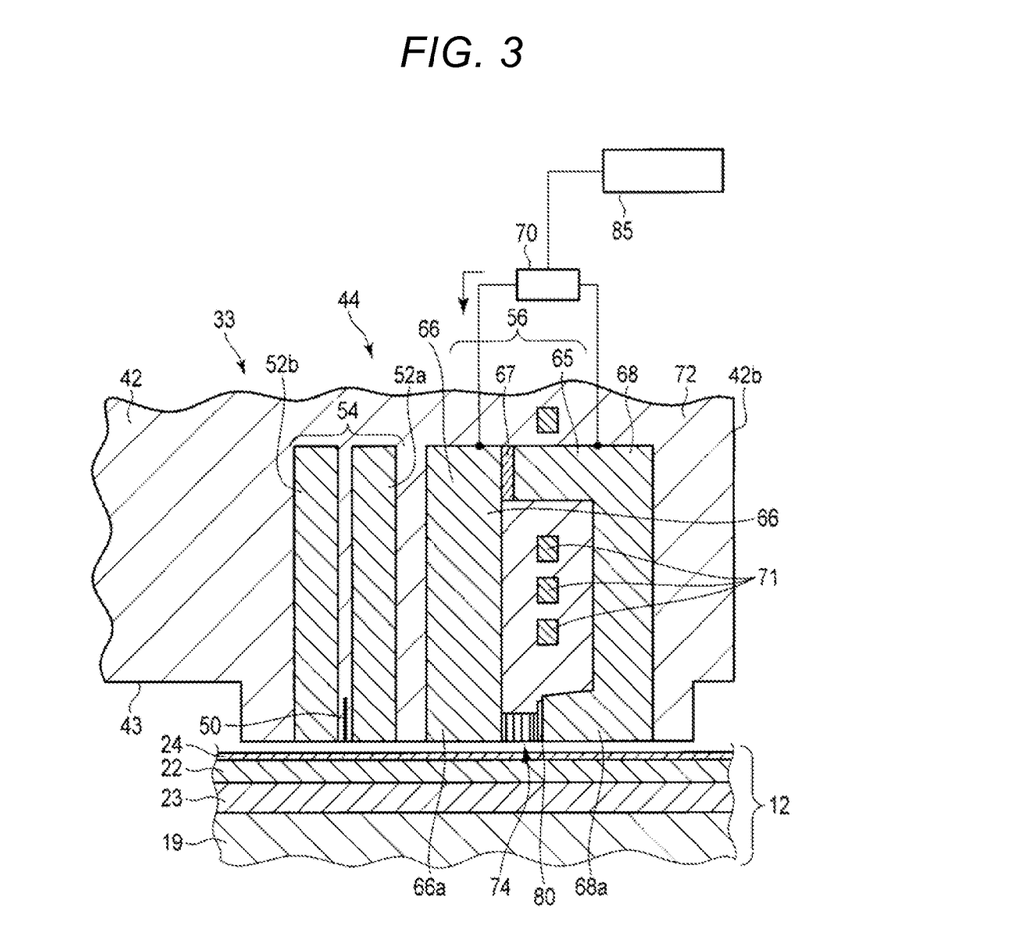
FIG. 3 is an enlarged cross-sectional view of a head part of the magnetic head.
Figure 4:
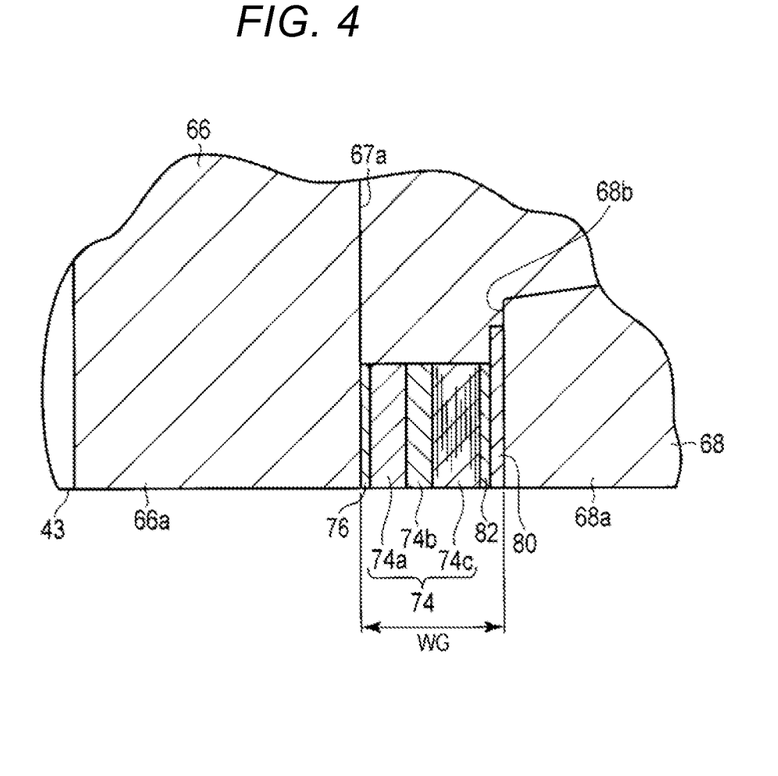
FIG. 4 is an enlarged cross-sectional view of the magnetic disk side end portion of a recording head.
Figure 5:
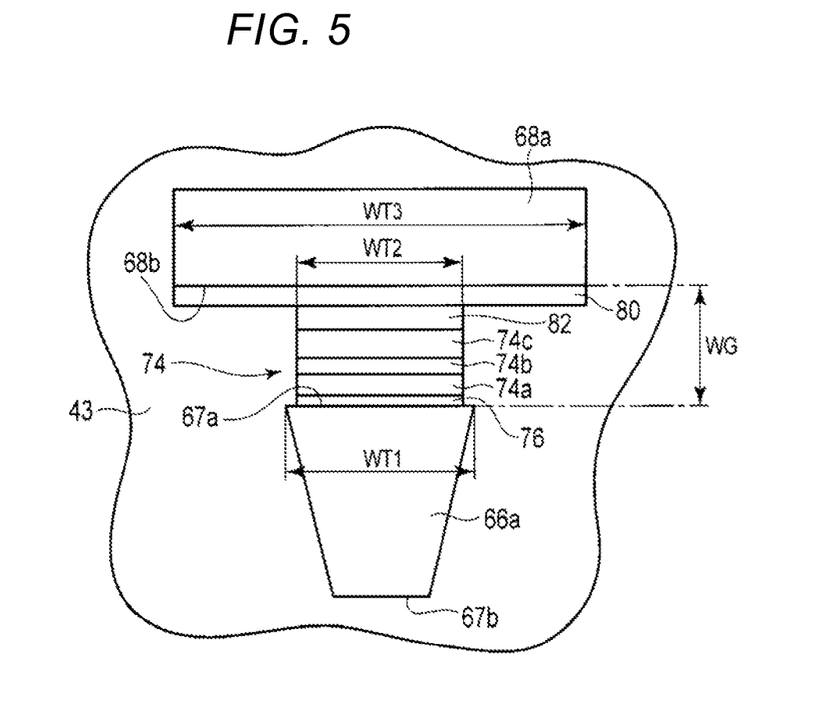
FIG. 5 is a plan view of the recording head from the disk facing surface side of a slider.

Subsequently, the configuration of the head part 44 of the magnetic head 33 will be described in detail. FIG. 3 is an enlarged cross-sectional view illustrating the head part of the magnetic head 33. FIG. 4 is an enlarged cross-sectional view illustrating the magnetic disk side end portion of the recording head. FIG. 5 is a plan view illustrating a recording head portion as seen from the disk facing surface (ABS) side of the slider.

As illustrated in FIGS. 3 and 4, the head part 44 includes a reproducing head 54 and a recording head 56 formed at the trailing end 42b of the slider 42 by a thin film process, and is formed as a separation-type magnetic head.

The reproducing head 54 includes a magnetic film. 50 that produces a magneto-resistance effect, and shield films 52a and 52b that are disposed on the trailing side and leading side of the magnetic film 50, with the magnetic film 50 disposed therebetween. The lower ends of the magnetic film 50 and the shield films 52a and 52b are exposed to the outside at the disk facing surface 43 of the slider 42.

The recording head 56 is provided at the trailing end 42b of the slider 42 with respect to the reproducing head 54. The recording head 56 includes a main magnetic pole 66 that is formed of a high saturation magnetization material which generates a recording magnetic field in a direction perpendicular to the surface of the magnetic disk 12, a write shield magnetic pole (a return yoke) 68 that is formed of a ferromagnetic material and is disposed on the trailing side of the main magnetic pole 66 with a write gap WG, a recording coil 71 that is disposed so as to be wound around a magnetic circuit including the main magnetic pole 66 and the write shield magnetic pole 68, and a microwave oscillator, for example, a spin torque oscillator 74 that is provided in the write gap WG between the leading end portion 66a of the main magnetic pole 66 and the write shield magnetic pole 68. The write shield magnetic pole 68 is provided for efficiently close a magnetic path through the soft magnetic layer 23 positioned immediately below the main magnetic pole 66.

The recording coil 71 is connected to a recording-current supplying circuit through a wiring (not illustrated). In order to write a signal in the magnetic disk 12, a recording current is supplied from the recording-current supplying circuit to the recording coil 71, whereby a recording magnetic field is excited at the main magnetic pole 66. The main magnetic pole 66 and the write shield magnetic pole 68 are connected to a drive-current supplying circuit 70 through wirings. A current circuit is formed so as to allow a drive current to flow from the drive-current supplying circuit 70 into the main magnetic pole 66, the spin torque oscillator 74, and the write shield magnetic pole 68 connected in series. If the drive current is supplied to the spin torque oscillator 74, the spin torque oscillator 74 generates a microwave, and the microwave is applied to the magnetic disk 12. Also, the drive-current supplying circuit 70 is connected to a control unit 85 provided on the control circuit board 25, and supplies the drive current to the spin torque oscillator 74 under control of the control unit 85.

The main magnetic pole 66 extends substantially in a direction perpendicular to the ABS 43. The lower end portion of the main magnetic pole 66 on the magnetic disk (12) side is tapered such that its width narrows toward a leading end surface 67b, and the leading end portion 66a is formed in a pillar shape having a width narrower than that of the other portion. As illustrated in FIG. 5, the leading end portion 66a of the main magnetic pole 66 is formed, for example, such that its cross section is trapezoidal, and has a trailing side end surface 67a that has a predetermined width and is positioned on the trailing end side, the leading side end surface 67b that faces the trailing side end surface and has a width narrower than that of the trailing side end surface, and two side surfaces. The leading end surface (lower end surface) of the main magnetic pole 66 is exposed to the outside at the ABS 43 of the slider 42. The width WT1 of the trailing side end surface 67a substantially corresponds to the track width of the magnetic disk 12.

As illustrated in FIGS. 3 and 4, the write shield magnetic pole 68 is formed substantially in a letter U shape, and the leading end portion 68a of the write shield magnetic pole 68 is formed in an elongated rectangular shape. The leading end surface of the write shield magnetic pole 68 is exposed to the outside at the ABS 43 of the slider 42. The leading side end surface 68b of the leading end portion 68a extends along the track width direction of the magnetic disk 12. The leading side end surface 68b is disposed substantially in parallel to the trailing side end surface 67a of the main magnetic pole 66 with the write gap WG so as to face the trailing side end surface 67a.

The write shield magnetic pole 68 has a connection portion 65 which is apart from the ABS 43 of the slider 42 and close to the upper portion of the main magnetic pole 66. The connection portion 65 is connected to the main magnetic pole 66 with a back gap portion 67 formed of an insulator such as $SiO_2$ therebetween. The back gap portion 67 electrically insulates the main magnetic pole 66 and the write shield magnetic pole 68 from each other. Since the back gap portion 67 is formed of an insulator as described above, it is possible to efficiently supply a current from the drive-current supplying circuit 70 to the spin torque oscillator 74 through the main magnetic pole 66 and the write shield magnetic pole 68 also serving as the electrodes of the spin torque oscillator 74. The insulator used for the back gap portion 67 may be $Al_2O_3$ instead of $SiO_2$.

As illustrated in FIGS. 3 to 5, the spin torque oscillator 74 is disposed between the trailing side end surface 67a of the leading end portion 66a of the main magnetic pole 66 and the leading side end surface 68b of the write shield magnetic pole 68, so as to be parallel to the trailing side end surface 67a and the leading side end surface 68b. That is, the spin torque oscillator 74 is formed in the write gap WG, such that the spin torque oscillator 74 is positioned within the range of the width WT1 of the leading end portion of the main magnetic pole in the track width direction (cross-track direction) and the width WT2 of the spin torque oscillator 74 in the track width direction is substantially the same as the width WT1 of the trailing side end surface 67a of the main magnetic pole 66 in the track width direction. Also, the lower end surface of the spin torque oscillator 74 is exposed to the outside at the ABS 43 of the slider 42.

The spin torque oscillator 74 is formed by sequentially stacking a spin injection layer 74a, an intermediate layer 74b, and an oscillation layer 74c from the main magnetic pole (66) side toward the write shield magnetic pole (68) side. The spin injection layer 74a is formed of an artificial lattice film such as a laminate of Co and Ni, and the intermediate layer 74b is formed of Cu and is non-magnetic, and the oscillation layer 74c is formed of a magnetic film of FeCo. The spin injection layer 74a is bonded to the main magnetic pole 66 with a base layer 76 which is formed of, for example, a laminated film of Ta, Ru, and Cu therebetween.

Between the spin torque oscillator 74 and the write shield magnetic pole 68, an anti-ferromagnetic layer 80 is formed on the leading side end surface 68b of the write shield magnetic pole 68. Further, between the oscillation layer 74c of the spin torque oscillator 74 and the anti-ferromagnetic layer 80, a separation layer 82 of a substantially non-magnetic metal layer is formed.

As described above, the base layer 76, the spin injection layer 74a, the intermediate layer 74b, the oscillation layer 74c, the separation layer 82, and the anti-ferromagnetic layer 80 are sequentially stacked in a direction parallel to the ABS 43 of the slider 42 or the surface of the magnetic disk, and each extend in a direction perpendicular to the ABS 43. The spin torque oscillator 74 is patterned so as to have, for example, the size of 40 nm on each side in a square shape.

The anti-ferromagnetic layer 80 is formed of a ferromagnetic material and formed on the leading side end surface 68b of the write shield magnetic pole 68, so as to have a width WT3 in the track width direction, and the width WT3 is equal to or larger than the width WT2 of the spin torque oscillator 74. Also, the anti-ferromagnetic layer 80 is formed so as to have a height equal to or larger than the height of the spin torque oscillator 74 (the length in a direction perpendicular to the ABS 43). In the present embodiment, the width WT3 of the anti-ferromagnetic layer 80 is set to be substantially the same as the width of the leading end portion 68a of the write shield magnetic pole. Therefore, the anti-ferromagnetic layer 80 faces the entire surface of the oscillation layer 74c of the spin torque oscillator 74.

The anti-ferromagnetic layer 80 applies a unidirectional exchange bias to the write shield magnetic pole 68. This exchange coupling considerably suppresses a spin wave from being induced in the write shield magnetic pole 68. As a result, magnetostatic coupling between the oscillation layer 74c and a magnetic multipole inside the write shield magnetic pole 68 caused by a spin wave is suppressed, and an oscillation inhibiting factor relative to the oscillation layer 74c is reduced.

Also, between the spin torque oscillator 74 and the anti-ferromagnetic layer 80, a substantially non-magnetic metal layer is formed as the separation layer 82. If the anti-ferromagnetic layer 80 is stacked directly on the oscillation layer 74c or the spin injection layer 74a of the spin torque oscillator 74, magnetization of each of these layers is biased in an in-plane direction of the corresponding layer, and thus oscillation is inhibited. For this reason, in the present embodiment, between the spin torque oscillator 74 and the anti-ferromagnetic layer 80, the non-magnetic separation layer 82 is provided.

Subsequently, material and thickness of each component will be described. In order to obtain a sufficient exchange magnetic anisotropy bias, it is preferable that the anti-ferromagnetic layer 80 has a thickness of 3 nm or more. Meanwhile, according to the need for gap reduction arising from a request for optimizing a recording magnetic field, it is preferable to reduce the thickness of each layer in the write gap WG. For this reason, the thickness of the anti-ferromagnetic layer 80 is set within a range from 3 nm or more to 7 nm or less.

As an anti-ferromagnetic material for forming the anti-ferromagnetic layer 80, IrMn, PtMn, FeMn, NiMn, or the like may be used. In order to apply electric power to the spin torque oscillator 74 through the anti-ferromagnetic layer 80, it is preferable to use an anti-ferromagnetic metal material having electric conductivity, as the material of the anti-ferromagnetic layer 80.

After the anti-ferromagnetic layer 80 and the write shield magnetic pole 68 are formed, the anti-ferromagnetic layer 80 and the write shield magnetic pole 68 may be annealed at high temperature in a magnetic field, whereby it is possible to fix a desired exchange coupling. In this case, in order to saturate the write shield magnetic pole 68, it is preferable to maximize the strength of a magnetic field to be applied. Specifically, it is preferable to apply a magnetic field of 3 KOe or more. The annealing temperature depends on the anti-ferromagnetic material. However, if the annealing temperature is within a range from 200° C. to 300° C., it is possible to fix the magnetization direction (direction of exchange magnetic anisotropy) of any anti-ferromagnetic material.

Figure 6:
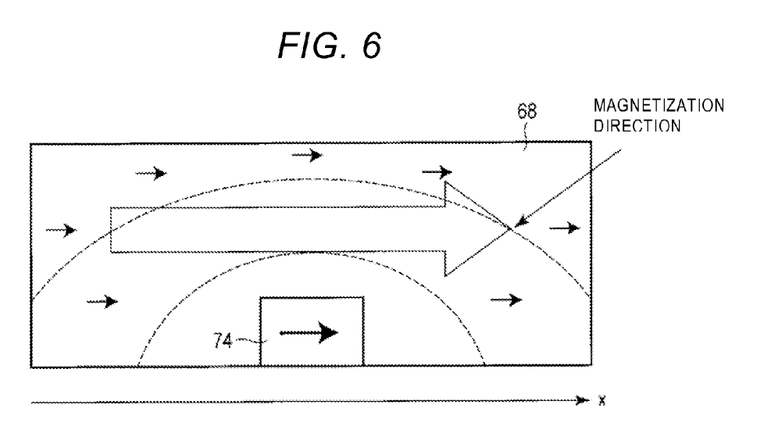
FIG. 6 schematically illustrates a fixed magnetization direction of a write shield magnetic pole in the recording head.

As illustrated in FIG. 6, in the write shield magnetic pole 68, magnetization directions may be fixed in one direction of the track width direction X. If the magnetization directions are set in a direction perpendicular to the ABS 43, the exchange bias becomes asymmetric with respect to reversal of the direction of the recording magnetic field between 0 and 1 during generation of the recording magnetic field, whereby the recording is inhibited. For this reason, in a case of fixing magnetization directions in one direction, it is necessary to apply the magnetic field in the track width direction X.

Figure 7:
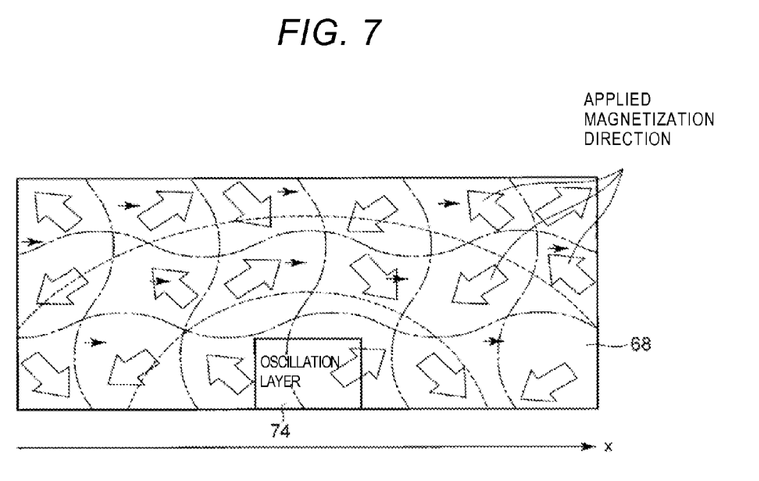
FIG. 7 schematically illustrates dispersions of fixed magnetization directions of the write shield magnetic pole in the recording head.

As illustrated in FIG. 7, the write shield magnetic pole 68 has a dispersion of fixed magnetization directions. If the magnetization directions are fixed in one direction, a magnetostatic field may be generated in the corresponding direction, and negatively influence the recording pattern of the recording medium. For this reason, it is preferable to have a dispersion of fixed the magnetization directions in the write shield magnetic pole 68, and impart unidirectional anisotropy in different directions for individual micro areas.

In a case of dispersion of the fixed magnetization directions with respect to the write shield magnetic pole 68, if spin annealing is performed on the write shield magnetic pole 68 and the anti-ferromagnetic layer 80 in a magnetic field, it is possible to obtain a desired state. Specifically, at a temperature from about 200° C. to 300° C., a magnetic field of 3 KOe or more is applied to the write shield magnetic pole 68 and the anti-ferromagnetic layer 80. In this state, the write shield magnetic pole 68 and the anti-ferromagnetic layer 80 are spun at a speed of about 1 rpm to 100 rpm. After annealing, even if temperature is lowered, spinning of the write shield magnetic pole 68 and the anti-ferromagnetic layer 80 is kept to near a room temperature. This makes it possible to obtain exchange coupling in which a dispersion of the fixed magnetization exists.

In order to cut off the exchange coupling between the anti-ferromagnetic layer 80 and the spin torque oscillator 74, a non-magnetic metal layer may be used. Specifically, as a non-magnetic material, Cu, Ru, Pt, Ag, Cr, Ir, Os, Ta, W, Mo, or the like may be used. Also, if the separation layer 82 has a thickness of 1 nm or more, it is possible to considerably suppress the exchange coupling. For this reason, it is preferable to form the separation layer 82 so as to have a thickness in a range of 1 nm or more to 3 nm or less.

Figure 8:
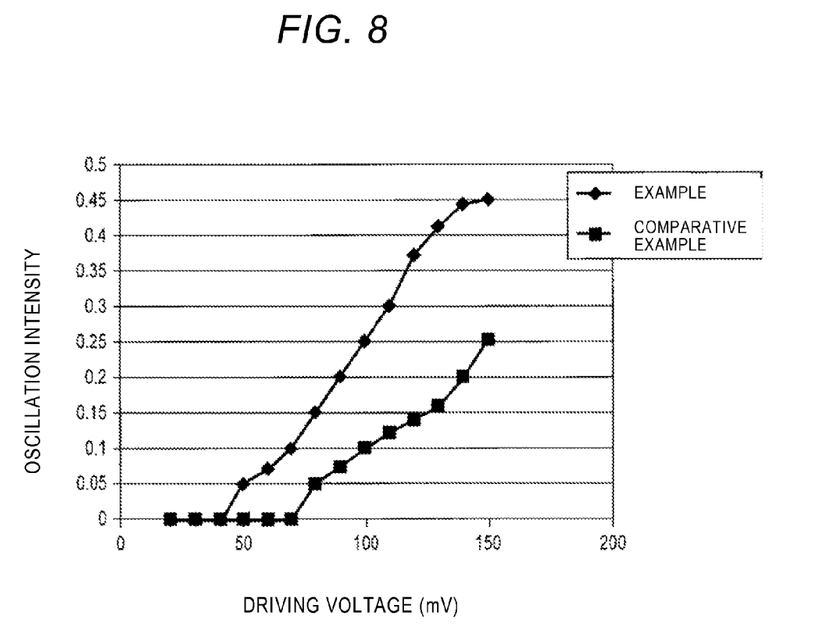
FIG. 8 illustrates a relation between driving voltage and oscillation intensity with respect to the recording head according to the first embodiment and a comparative example.

The oscillation intensity of the spin torque oscillator of the microwave assisted magnetic recording head 56 having the above-described configuration during application of an oscillation driving voltage is compared with the oscillation intensity of a spin torque oscillator of a recording head without an anti-ferromagnetic layer during application of the oscillation driving voltage according to a comparative example. FIG. 8 illustrates measured results.

Also, in the recording heads of the embodiment and the comparative example, main magnetic poles and write shield magnetic poles are formed of an alloy of Fe, Co, and Ni, and write gaps are set to 30 nm. The spin torque oscillators have the same configuration, and each have a spin injection layer formed of FeCo and having a thickness of 0.5 nm, an intermediate layer formed of Cu and having a thickness of 2 nm, and an oscillation layer formed of FeCo and having a thickness of 12 nm. The recording head of the embodiment has a separation layer and an anti-ferromagnetic layer between the spin torque oscillator and the write shield magnetic pole, and the separation layer is formed of Ru so as to have a thickness of 1 nm, and the anti-ferromagnetic layer is formed of IrMn so as to have a thickness of 4 nm. The recording head of the comparative example has only a separation layer formed of Ru between the spin torque oscillator and the write shield magnetic pole and having a thickness of 5.5 nm.

Figure 9:
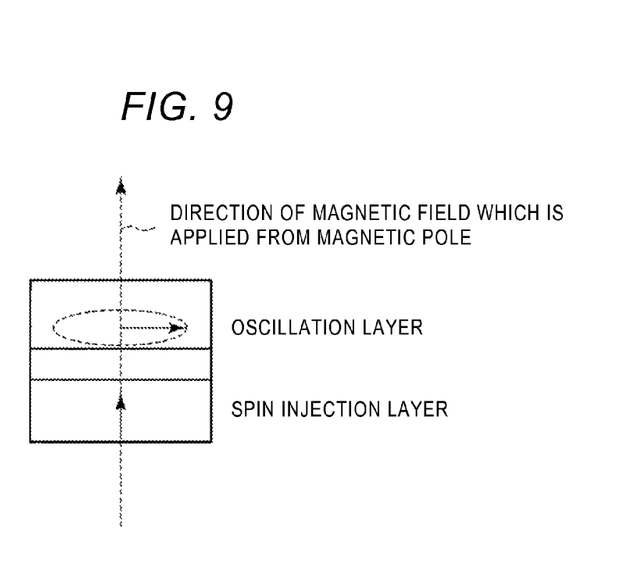
FIG. 9 schematically illustrates a spin wave generation state in the spin torque oscillator of the recording head.

A recording current of 40 mA is applied, and in that state, measurement is performed. The oscillation intensity of a spin torque oscillator is estimated using a magneto-resistance effect based on the relative angle between the magnetization direction in a corresponding oscillation layer and the magnetization direction in a corresponding spin injection layer. As illustrated in FIG. 9, based on the value of the magneto-resistance effect, in a case where the magnetization direction in the oscillation layer and the magnetization direction in the spin injection layer are parallel to each other, 0 is defined as an indicator representing an angle formed by the magnetization direction in the oscillation layer and the magnetization direction in the spin injection layer, and in a case where both magnetization directions are perpendicular to each other (the state illustrated in FIG. 9), 0.5 is defined as the corresponding angle, and in a case where both magnetization directions are antiparallel with respect to each other, 1 is defined as the corresponding angle. FIG. 8 illustrates the comparison result of oscillation intensity defined as described above.

From FIG. 8, it may be seen that the recording head of the present embodiment may obtain higher oscillation intensity at low driving voltage as compared to the recording head of the comparative example. In order to obtain a sufficient microwave, it is preferable to achieve oscillation intensity of 0.3 or more. The recording head of the present embodiment may achieve oscillation intensity of 0.3 or more at a lower driving voltage as compared to the recording head of the comparative example. As a result, it is possible to enhance the microwave assist effect.

According to the microwave-assisted magnetic recording head configured as described above according to the first embodiment, and the HDD having the microwave-assisted magnetic recording head, since the anti-ferromagnetic layer 80 is provided between the write shield magnetic pole 68 and the spin torque oscillator 74 so as to be in contact with the write shield magnetic pole 68, it is possible to cause unidirectional anisotropy of magnetization, or anisotropy in which dispersion of the fixed magnetization directions exists, in the write shield magnetic pole 68. Therefore, it is possible to suppress a spin wave from being induced in the write shield magnetic pole 68, and improve the oscillation efficiency of the spin torque oscillator 74. From the above description, according to the present embodiment, it is possible to obtain a microwave-assisted magnetic recording head capable of improving microwave oscillation efficiency and performing stable microwave-assisted magnetic recording, and a magnetic recording device having the microwave-assisted magnetic recording head.

Subsequently, recording heads of HDDs according to other embodiments will be described. In other embodiments to be described below, parts identical to those of the first embodiment described above are denoted by the same reference symbols, and will not be described in detail. Other embodiments will be described in detail with a focus on differences with respect to the first embodiment.

Second Embodiment

Figure 10:
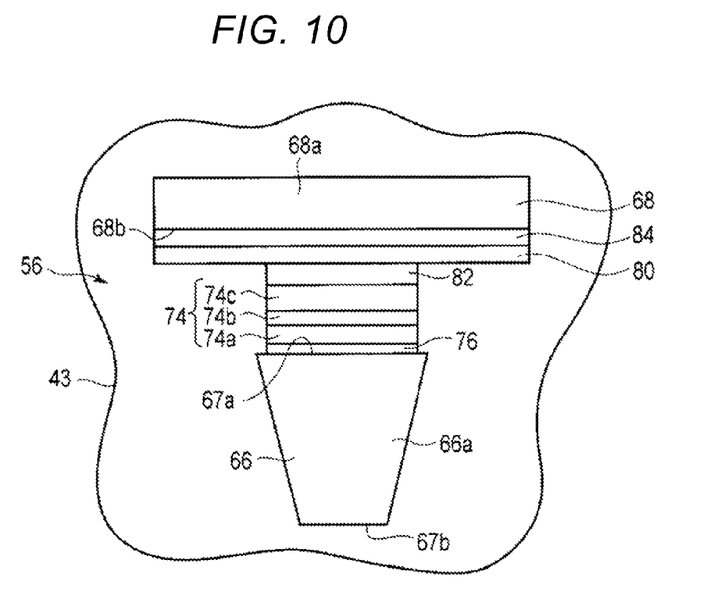
FIG. 10 is a plan view of a recording head of a magnetic disk device according to a second embodiment from the disk facing surface side of a slider.

FIG. 10 is a plan view illustrating a recording head of a magnetic disk device according to a second embodiment as seen from the disk facing surface side of a slider. According to the second embodiment, the recording head 56 further includes a coupling adjusting layer 84, which is formed between the write shield magnetic pole 68 and the anti-ferromagnetic layer 80. The coupling adjusting layer 84 has, for example, the same width and height as those of the anti-ferromagnetic layer 80, and is stacked on the leading side end surface 68b of the write shield magnetic pole 68.

The coupling adjusting layer 84 is formed of a non-magnetic metal layer and has a thickness of from 0.2 nm or more to 2 nm or less. As the material of the coupling control layer, specifically, Cu, Ru, Pt, Ag, Cr, Ir, Os, Ta, W, Mo, or the like may be used. Also, even a magnetic metal having weak saturation magnetization may be used for the coupling adjusting layer 84. Specifically, a material having a preferred saturation magnetization, which is obtained by adding certain amount of at least one selected from Al, Mn, Cu, Pt, Au, Ag, Ge, Ga, and Si to a magnetic metal selected from Fe, Co, and Ni, may be used.

Since the coupling adjusting layer 84 is provided between the write shield magnetic pole 68 and the anti-ferromagnetic layer 80 as described above, it is possible to adjust the exchange bias strength relative to the write shield magnetic pole 68.

Third Embodiment

Figure 11:
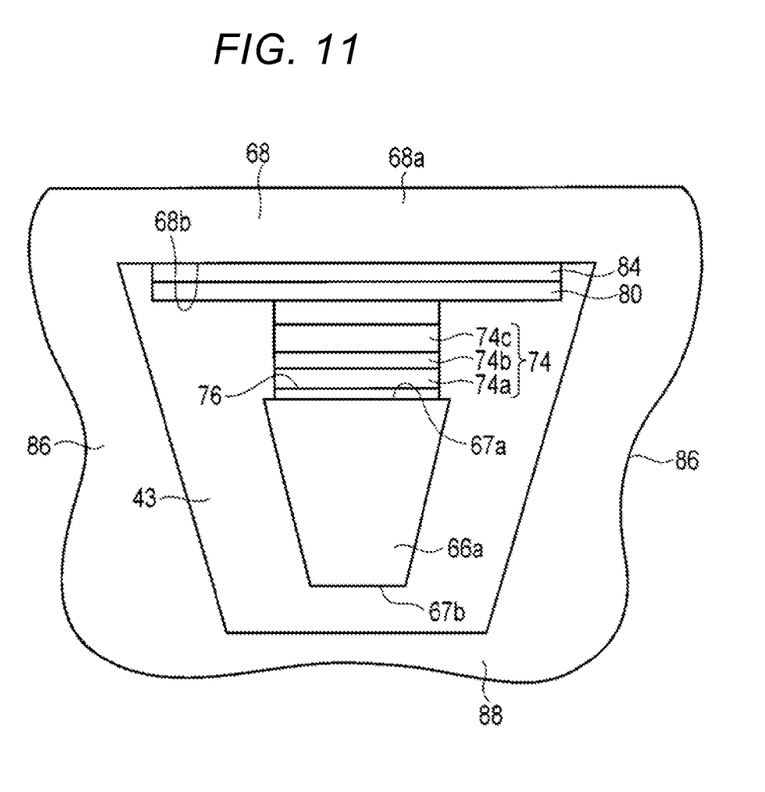
FIG. 11 is a plan view of a recording head of a magnetic disk device according to a third embodiment from the disk facing surface side of a slider.

FIG. 11 is a plan view of the recording head of a magnetic disk device according to a third embodiment as seen from the disk facing surface side of a slider. According to the present embodiment, the recording head 56 includes a pair of side shields 86 that is provided on both sides of the main magnetic pole 66 so as to be magnetically isolated from the main magnetic pole 66, and a leading shield 88 that is provided on the leading side of the main magnetic pole 66 so as to be magnetically isolated from the leading side, in addition to the write shield magnetic pole 68. The pair of side shields 86 and the leading shield 88 may be formed integrally with the write shield magnetic pole 68.

Since the side shields 86 and the leading shield 88 are provided, it is possible to more surely suppress a leakage of magnetic field, and prevent erroneous deletion of a neighboring track, and the like.

In the second embodiment and the third embodiment described above, the other configurations of the recording head are the same as those of the first embodiment, and it is possible to obtain the same or similar effect as those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the material of the magnetic layer used for the spin torque oscillator is not limited to that of the magnetic later in the above-described embodiments, and may be appropriately selected. In the above-described embodiments, the spin torque oscillator is formed by sequentially stacking the spin injection layer, the intermediate layer, and the oscillation layer. However, conversely, the oscillation layer, the intermediate layer, and the spin injection layer may be sequentially stacked.

What is claimed is:

1. A magnetic recording head comprising:
    a main magnetic pole in which a recording magnetic field is generated;
    a write shield magnetic pole disposed alongside the main magnetic pole with a gap therebetween;
    a spin torque oscillator disposed within the gap and configured to generate a microwave;
    an anti-ferromagnetic layer disposed within the gap between the write shield magnetic pole and the spin torque oscillator; and
    a non-magnetic metal layer disposed within the gap between the spin torque oscillator and the anti-ferromagnetic layer, wherein
    the write shield magnetic pole has a magnetic anisotropy, and a magnetization direction thereof is fixed in a direction parallel to a direction in which the anti-ferromagnetic layer and the non-magnetic metal layer are stacked.

2. The magnetic recording head according to claim 1, wherein
    the anti-ferromagnetic layer is formed of at least one material selected from IrMn, PtMn, FeMn, and NiMn.

3. The magnetic recording head according to claim 1, wherein
    the anti-ferromagnetic layer has a thickness that is equal to or greater than 3 nm and equal to or smaller than 7 nm.

4. The magnetic recording head according to claim 1, wherein
    the non-magnetic metal layer is formed of at least one material selected from Cu, Ru, Pt, Ag, Cr, Ir, Os, Ta, W, and Mo.

5. The magnetic recording head according to claim 1, wherein
    the non-magnetic metal layer has a thickness that is equal to or greater than 1 nm and equal to or smaller than 3 nm.

6. The magnetic recording head according to claim 1, further comprising:
    a coupling adjusting layer disposed within the gap between the anti-ferromagnetic layer and the write shield magnetic pole,
    wherein the coupling adjusting layer is formed of at least one non-magnetic metal selected from Cu, Ru, Pt, Ag, Cr, Ir, Os, Ta, W, and Mo, or is formed of at least one material selected from Al, Mn, Cu, Pt, Au, Ag, Ge, Ga, and Si, and at least one magnetic metal selected from Fe, Co, and Ni.

7. The magnetic recording head according to claim 1, wherein
    the coupling adjusting layer has a thickness that is equal to or larger than 0.2 nm and equal to or smaller than 3 nm.

8. A magnetic recording device comprising:
    a magnetic recording medium;
    a driving unit configured to rotate the magnetic recording medium; and
    a recording head configured to write data in the magnetic recording medium and comprising:
        a main magnetic pole in which a recording magnetic field to write the data is generated;

a write shield magnetic pole disposed alongside the main magnetic pole with a gap therebetween;
a spin torque oscillator disposed within the gap and configured to generate a microwave;
an anti-ferromagnetic layer disposed within the gap between the write shield magnetic pole and the spin torque oscillator; and
a non-magnetic metal layer disposed within the gap between the spin torque oscillator and the anti-ferromagnetic layer, wherein
the write shield magnetic pole has a magnetic anisotropy, and a magnetization direction thereof is fixed in a direction parallel to a direction in which the magnetic recording medium is rotated.

9. The magnetic recording device according to claim 8, wherein
the anti-ferromagnetic layer is formed of at least one material selected from IrMn, PtMn, FeMn, and NiMn.

10. The magnetic recording device according to claim 8, wherein
the anti-ferromagnetic layer has a thickness that is equal to or greater than 3 nm and equal to or smaller than 7 nm.

11. The magnetic recording device according to claim 8, wherein
the non-magnetic metal layer is formed of at least one material selected from Cu, Ru, Pt, Ag, Cr, Ir, Os, Ta, W, and Mo.

12. The magnetic recording device according to claim 8, wherein
the non-magnetic metal layer has a thickness that is equal to or greater than 1 nm and equal to or smaller than 3 nm.

13. The magnetic recording device according to claim 8, wherein
the recording head further comprises a coupling adjusting layer disposed within the gap between the anti-ferromagnetic layer and the write shield magnetic pole, and
the coupling adjusting layer is formed of at least one non-magnetic metal selected from Cu, Ru, Pt, Ag, Cr, Ir, Os, Ta, W, and Mo, or is formed of at least one material selected from Al, Mn, Cu, Pt, Au, Ag, Ge, Ga, and Si, and at least one magnetic metal selected from Fe, Co, and Ni.

14. The magnetic recording device according to claim 8, wherein
the coupling adjusting layer has a thickness that is equal to or larger than 0.2 nm and equal to or smaller than 3 nm.

15. A magnetic recording head comprising:
a main magnetic pole in which a recording magnetic field is generated;
a write shield magnetic pole disposed alongside the main magnetic pole with a gap therebetween;
a spin torque oscillator disposed within the gap and configured to generate a microwave;
a first layer containing Mn disposed within the gap between the write shield magnetic pole and the spin torque oscillator; and
a second layer containing non-magnetic metal disposed within the gap between the spin torque oscillator and the anti-ferromagnetic layer, wherein
the write shield magnetic pole has a magnetic anisotropy, and a magnetization direction thereof is fixed in a direction parallel to a direction in which the first and second layers are stacked.

16. A magnetic recording head comprising:
a main magnetic pole in which a recording magnetic field is generated;
a write shield magnetic pole disposed alongside the main magnetic pole with a gap therebetween;
a spin torque oscillator disposed within the gap and configured to generate a microwave;
an anti-ferromagnetic layer disposed within the gap between the write shield magnetic pole and the spin torque oscillator; and
a non-magnetic metal layer disposed within the gap between the spin torque oscillator and the anti-ferromagnetic layer, wherein
the write shield magnetic pole is formed of a group of micro areas, each having a magnetic anisotropy, and
a magnetization of each of the micro areas is different from magnetization directions of micro areas in the vicinity thereof.

17. The magnetic recording head according to claim 16, wherein
the anti-ferromagnetic layer is formed of at least one material selected from IrMn, PtMn, FeMn, and NiMn.

18. The magnetic recording head according to claim 16, wherein
the anti-ferromagnetic layer has a thickness that is equal to or greater than 3 nm and equal to or smaller than 7 nm.

19. The magnetic recording head according to claim 16, wherein
the non-magnetic metal layer is formed of at least one material selected from Cu, Ru, Pt, Ag, Cr, Ir, Os, Ta, W, and Mo.

20. The magnetic recording head according to claim 16, wherein
the non-magnetic metal layer has a thickness that is equal to or greater than 1 nm and equal to or smaller than 3 nm.

21. The magnetic recording head according to claim 16, further comprising:
a coupling adjusting layer disposed within the gap between the anti-ferromagnetic layer and the write shield magnetic pole,
wherein the coupling adjusting layer is formed of at least one non-magnetic metal selected from Cu, Ru, Pt, Ag, Cr, Ir, Os, Ta, W, and Mo, or is formed of at least one material selected from Al, Mn, Cu, Pt, Au, Ag, Ge, Ga, and Si, and at least one magnetic metal selected from Fe, Co, and Ni.

22. The magnetic recording head according to claim 16, wherein
the coupling adjusting layer has a thickness that is equal to or larger than 0.2 nm and equal to or smaller than 3 nm.

23. A magnetic recording device comprising:
a magnetic recording medium;
a driving unit configured to rotate the magnetic recording medium; and
a recording head configured to write data in the magnetic recording medium and comprising:
a main magnetic pole in which a recording magnetic field to write the data is generated;
a write shield magnetic pole disposed alongside the main magnetic pole with a gap therebetween;
a spin torque oscillator disposed within the gap and configured to generate a microwave;
an anti-ferromagnetic layer disposed within the gap between the write shield magnetic pole and the spin torque oscillator; and
a non-magnetic metal layer disposed within the gap between the spin torque oscillator and the anti-ferromagnetic layer, wherein
the write shield magnetic pole is formed of a group of micro areas, each having a magnetic anisotropy, and a magnetization of each of the micro areas is different from magnetization directions of micro areas in the vicinity thereof.

24. The magnetic recording device according to claim 23, wherein
the anti-ferromagnetic layer is formed of at least one material selected from IrMn, PtMn, FeMn, and NiMn.

25. The magnetic recording device according to claim 23, wherein
the anti-ferromagnetic layer has a thickness that is equal to or greater than 3 nm and equal to or smaller than 7 nm.

26. The magnetic recording device according to claim 23, wherein
the non-magnetic metal layer is formed of at least one material selected from Cu, Ru, Pt, Ag, Cr, Ir, Os, Ta, W, and Mo.

27. The magnetic recording device according to claim 23, wherein
the non-magnetic metal layer has a thickness that is equal to or greater than 1 nm and equal to or smaller than 3 nm.

28. The magnetic recording device according to claim 23, wherein
the recording head further comprises a coupling adjusting layer disposed within the gap between the anti-ferromagnetic layer and the write shield magnetic pole, and
the coupling adjusting layer is formed of at least one non-magnetic metal selected from Cu, Ru, Pt, Ag, Cr, Ir, Os, Ta, W, and Mo, or is formed of at least one material selected from Al, Mn, Cu, Pt, Au, Ag, Ge, Ga, and Si, and at least one magnetic metal selected from Fe, Co, and Ni.

29. The magnetic recording device according to claim 23, wherein
the coupling adjusting layer has a thickness that is equal to or larger than 0.2 nm and equal to or smaller than 3 nm.

* * * * *